United States Patent
Holohan et al.

(10) Patent No.: US 8,746,162 B2
(45) Date of Patent: Jun. 10, 2014

(54) VERTICALLY-VARIABLE OCEAN SAIL SYSTEM

(75) Inventors: Eric Holohan, Mill Neck, NY (US); Edward Anthony Shergalis, Riverside, CT (US); James Gibson Rhodes, New York, NY (US); Jeremy Wyatt Linzee, Stony Brook, NY (US)

(73) Assignee: Magnuss Ltd., Hamilton (BM)

( * ) Notice: Subject to any disclaimer, the term of this patent is extended or adjusted under 35 U.S.C. 154(b) by 0 days.

(21) Appl. No.: 13/530,534

(22) Filed: Jun. 22, 2012

(65) Prior Publication Data

US 2013/0042798 A1 Feb. 21, 2013

Related U.S. Application Data

(60) Provisional application No. 61/499,904, filed on Jun. 22, 2011.

(51) Int. Cl.
*B63H 9/02* (2006.01)
(52) U.S. Cl.
USPC ..................................... 114/39.3; 114/102.29
(58) Field of Classification Search
USPC .............................. 114/39.3, 102.29; 416/1, 4
See application file for complete search history.

(56) References Cited

U.S. PATENT DOCUMENTS

| | | | |
|---|---|---|---|
| 1,674,169 A * | 6/1928 | Flettner | 416/4 |
| 2,713,392 A * | 7/1955 | Von Karman et al. | 416/4 |
| 4,016,823 A | 4/1977 | Davis | |
| 4,401,284 A | 8/1983 | Austin | |
| 4,602,584 A * | 7/1986 | North et al. | 114/39.3 |
| 4,718,370 A | 1/1988 | Portell-Vila | |
| 5,263,429 A | 11/1993 | Brinkmann | |
| 7,966,777 B2 | 6/2011 | Douglas et al. | |
| 8,261,681 B2 * | 9/2012 | Wobben | 114/39.3 |
| 2002/0139284 A1 | 10/2002 | Iacoboni | |
| 2009/0241820 A1 | 10/2009 | Rohden | |
| 2011/0098601 A1 | 4/2011 | Huynh et al. | |
| 2011/0098605 A1 | 4/2011 | deGreef et al. | |

FOREIGN PATENT DOCUMENTS

| | | |
|---|---|---|
| EP | 0 474 363 A1 | 3/1992 |
| GB | 2 187 154 A | 9/1987 |

OTHER PUBLICATIONS

"PCT Notification of Transmittal of the International Search Report and the Written Opinion of the International Searching Authority, or the Declaration", mailed Jan. 9, 2013, for International Application No. PCT/US2012/043746, 10pgs.

* cited by examiner

*Primary Examiner* — Lars A Olson
(74) *Attorney, Agent, or Firm* — Buckley, Maschoff & Talwalkar LLC

(57) ABSTRACT

Embodiments of the present invention provide mechanical sail systems, methods, apparatus, and code which allow use of the Magnus effect to provide thrust to a ship. In some embodiments, a mechanical sail system is provided which includes a silo, positioned below a deck level of a ship, a lift carriage, mounted within the silo, and supporting a first sail cylinder and a second sail cylinder, and at least a first drive motor coupled to a control system for selectively positioning the lift carriage within the silo, the control system operable to control the at least first drive motor to position the lift carriage at a top position within the silo to deploy the first and second sail cylinders.

22 Claims, 13 Drawing Sheets

VERTICALLY-VARIABLE OCEAN SAIL SYSTEM

CROSS REFERENCE TO RELATED APPLICATIONS

This application claims benefit of, and priority to, U.S. Provisional Patent Application Ser. No. 61/499,904 filed on Jun. 22, 2011, the contents of which are hereby incorporated by reference in their entirety for all purposes.

FIELD

Some embodiments relate to ship propulsion systems. More specifically, some embodiments provide a vertically-variable ocean sail system to supplement ship propulsion systems.

BACKGROUND

The global shipping industry has reached a substantial tipping point in terms of energy consumption. Fuel costs currently consume 35% of the industry's global revenue—the highest share of revenue in its history. The costs are steadily on the rise and show no signs of abating. It would be desirable to provide systems and methods to reduce these fuel costs, especially given fuel costs represent often more than two-thirds of a ship owner's/operator's annual expense.

Although shipping is a highly efficient means of transportation on a per ton/mile basis compared with other modes of transportation, ships are still major sources of pollution and $CO_2$ emissions. Large commercial ships use bunker fuel, the tail end of the oil refining process that emits a cocktail of gases that harm both the planet and human health. Along with $CO_2$, there are nitrogen oxides and sulfur oxides (the cause of acid rain) as well as what is known as particulate matter.

The global shipping trade is responsible for emitting a billion tons of $CO_2$ a year, and as the global economy recovers this figure is bound to escalate. This means shipping, as a single industry, is a larger $CO_2$ emitter than an entire industrialized country like Germany. If the shipping industry were a country it would rank number 6 in the world $CO_2$ league table. It would be desirable to provide systems and methods to reduce these emissions.

DETAILED DESCRIPTION

Figure 1:
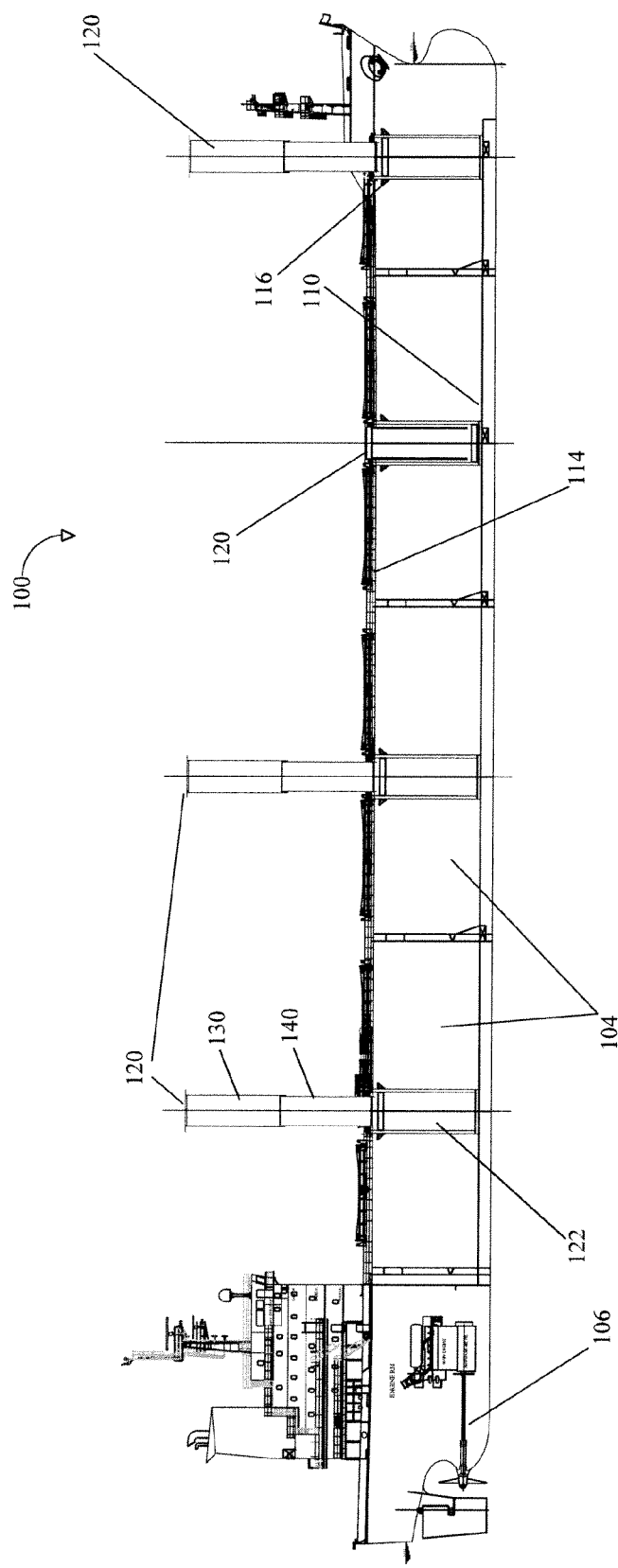
FIG. 1 is a sectional view of a ship using features of some embodiments.

Embodiments of the present invention provide systems, methods and apparatus that reduce energy consumption and emissions for ships. These reductions are made possible by retrofitting or otherwise installing one or more vertically-variable ocean sail system (referred herein as "sail systems" or "VOSS") pursuant to the present invention. The sail systems include sail cylinders that rotate and convert wind into forward thrust and thereby ship propulsion. Embodiments of the present invention allow the sail systems to augment a ship's main engine, whereby the main engine can be throttled back while still maintaining voyage speed. Pursuant to some embodiments, the sail systems are fully retractable and can be lowered in unfavorable conditions or while loading and unloading the ship's cargo. The thrust created by the wind over the sail cylinder means the vessel needs less power from its main engine, resulting in lower fuel consumption. Under typical operating conditions, a ship's average annual fuel costs can be reduced meaningfully. Further, if vessels are retrofitted or designed to incorporate the sail systems of the present invention, millions of tons of $CO_2$ emissions could be avoided each year.

In some embodiments, a mechanical sail system is provided which includes a silo, positioned below a deck level of a ship, a lift carriage, mounted within the silo, and supporting a first sail cylinder and a second sail cylinder, and at least a first drive motor coupled to a control system for selectively positioning the lift carriage within the silo, the control system operable to control the at least first drive motor to position the lifting carriage at a top position within the silo to deploy the first and second sail cylinders.

Features of some embodiments will now be described by first referring to FIG. 1 which is a sectional view of a ship 100 with four sail systems 120 installed thereon. Ship 100, as shown, is a bulk cargo ship (otherwise referred to as a "bulk carrier", "bulk freighter", or simply a "bulker") having one or more cargo holds 104 for transporting bulk cargo. Those skilled in the art, upon reading this disclosure, will appreciate that features of the present invention may be used with desirable results on a number of other types, configurations and sizes of ships, and that use on a bulker is simply for illustrative purposes. The use of the sail systems 120 and control systems of the present invention are described for use on bulk cargo ships in the present disclosure in order to describe features of some embodiments and to describe specific configurations that are believed to provide desirable results but they can be used on other types of ships as well.

Ship 100 may be retrofitted or specially designed to utilize the sail systems 120 to supplement the ship's existing propeller propulsion systems 106. The sail systems 120 are configured to reduce the amount of fuel used by the ship 100 by harnessing available wind at sea to produce forward thrust and propel a ship via the "Magnus effect."

The Magnus effect is a phenomenon where a spinning cylinder in a wind stream produces a force roughly perpendicular to the direction of wind. The overall behavior is similar to that of an aerofoil with a circulation that is generated by the mechanical rotation, rather than by aerofoil action. The sail systems 120 of the present invention use this effect to generate sufficient propulsion to reduce a ship's reliance on fossil fuel.

While further details of the construction, design and operation of the sail systems 120 will be provided below in conjunction with FIGS. 2-13, a brief introduction will be provided here. Each sail system 120 is formed as a cylinder divided into individual sections that go up ("extend") and down ("retract").

In the embodiments depicted herein, the sail systems 120 are two stage, retractable mechanical sail systems, including an upper sail cylinder 130 and a lower sail cylinder 140. The upper sail cylinder 130 and lower sail cylinder 140 retract into a silo 122 for stowage beneath the deck 114 when not in use. The inventors have discovered that the use of two sections provides desirable results. For example, by using a smaller number of sections, the sail systems 120 are less susceptible to racking and jamming. Further, the configurations described herein provide desirable results as a conventional sail, harnessing the wind to propel a vessel, but with greater efficiency and resultant power. Further, the use of a smaller number of sections provides greater efficiencies in manufacturing, installation and maintenance. While the use of two sail sections (an upper sail cylinder and a lower sail cylinder) are described herein, those skilled in the art will appreciate that other numbers of sections may be used with similarly desirable results.

In some embodiments, each sail system 120 includes the following primary components: (i) sail cylinders 130, 140, (ii) a lift carriage (described further below in conjunction with FIG. 6), (iii) a lift drive system (described further below in conjunction with FIGS. 11 and 12), and (iv) a silo 122 (or "housing"). Together the sail systems 120 installed on a ship 100 are controlled and operated by a command and control system. In general, the physical dimensions of the components of the sail system 120 (other than the command and control system) are selected as a function of three primary attributes: the space available below deck, the space available on the deck between the hatch combings and the aspect ratio of the sail cylinder.

While manufacturing and other considerations may impact the physical dimensions, the inventors have discovered the following design attributes provide desirable results for a bulk carrier or tanker. In general, the space available below the weather deck in a bulk carrier, or tanker of normal form, can accommodate 54 feet of exposed sail area and the related overlap required to facilitate locking the sail sections together when deployed. On deck space between hatch combings dictates a sail cylinder diameter of 18 feet, while maintaining sufficient space surrounding a deployed (extended) sail system to conduct without impeding routine ship operations.

In some embodiments, an optimal sail aspect for the entire sail system 120 is 6:1 where the height is six and the diameter is one. Considering the ship dimensions on and below deck, the sail cylinder 130, 140 will therefore be 18 feet in diameter and 108 feet high (that is, the height overall in a deployed or extended state is 108 feet).

Pursuant to some embodiments, to achieve these desired dimensions, the sail cylinder design is selected to provide (a) the fewest number of nesting sail sections that can fit below the weather deck and (b) a sail cylinder diameter which achieves the optimal surface to wind-flow-velocity ratio, within the maximum designed rotational speed range. In one embodiment, the rotational speed of the sail cylinder is optimized for each wind speed up to 40 knots resulting in a maximum rotational speed of 200 rpm. In some embodiments, the ratio of surface velocity of the sail cylinders to the wind speed is used as an important factor to develop and sustain a pressure differential between the rear and the front of the sail system 120 that defines the thrust or drive vector.

The sail cylinders 130, 140 are constructed to allow the upper sail cylinder 130 to fit over the lower sail cylinder 140. This allows the upper sail cylinder 130 to shield water, preventing precipitation and spray from leaking inside the sail system 120. If the sail cylinders were constructed with the upper sail cylinder 130 fitting inside the lower sail cylinder 140, water would run down the exterior of the upper sail cylinder 140 and a rubber seal would be required to deflect the water from entering the sail system 120 at the top of the lower sail cylinder 140.

As will be described further below, each of the sail cylinders 130, 140 is formed from a series of hoop-like frames which form the horizontal ribs of the framework. Tubular vertical stringers are evenly spaced around the circumference of the hoops and connect the hoops together as a cylindrical lattice. Intermittent diagonals are fitted between the hoops, and are spaced to produce torque resistance in the framework. The stringers and frame elements (referred to herein as the structural framework) may be formed of steel or other materials which provide reduced galvanic corrosion with the ship 100 and sufficient strength. The sail cylinders 130, 140 may be covered with a light weight outer skin which reduces cyclic loads, vibration, and stress on the sail systems 120. For example, the outer skin may be formed of lightweight and weather resistant materials such as aluminum or the like.

Each sail system 120 is retractable and may be extended for use (as shown in FIG. 1) or retracted below the deck 114 to avoid disruption of loading or unloading of cargo or other activities. Pursuant to some embodiments, the use of sail systems 120 provides sufficient additional propulsion to a ship to reduce fuel consumption and emissions by a significant amount. The size and selection of the sail systems 120 may depend, in part, on the size of the ship as well as the desired efficiencies to be achieved. The size and shape of the sail cylinders have been devised as the optimum confluence of several aspects of the space available in the ship as well as the aspect ratio of the sail and the space available on the deck between the hatch combings.

For example, those skilled in the art, upon reading this disclosure, will appreciate that one design approach that may be used to select and determine the sizing and configuration of a sail system pursuant to some embodiments is to model aspects of the design using theorems such as the Kutta-Joukowski theorem of lift, or other fluid and flow dynamics modeling approaches.

A number of other modeling and design approaches may be used to select a sail system design and configuration that meets a particular design need.

Figure 2:
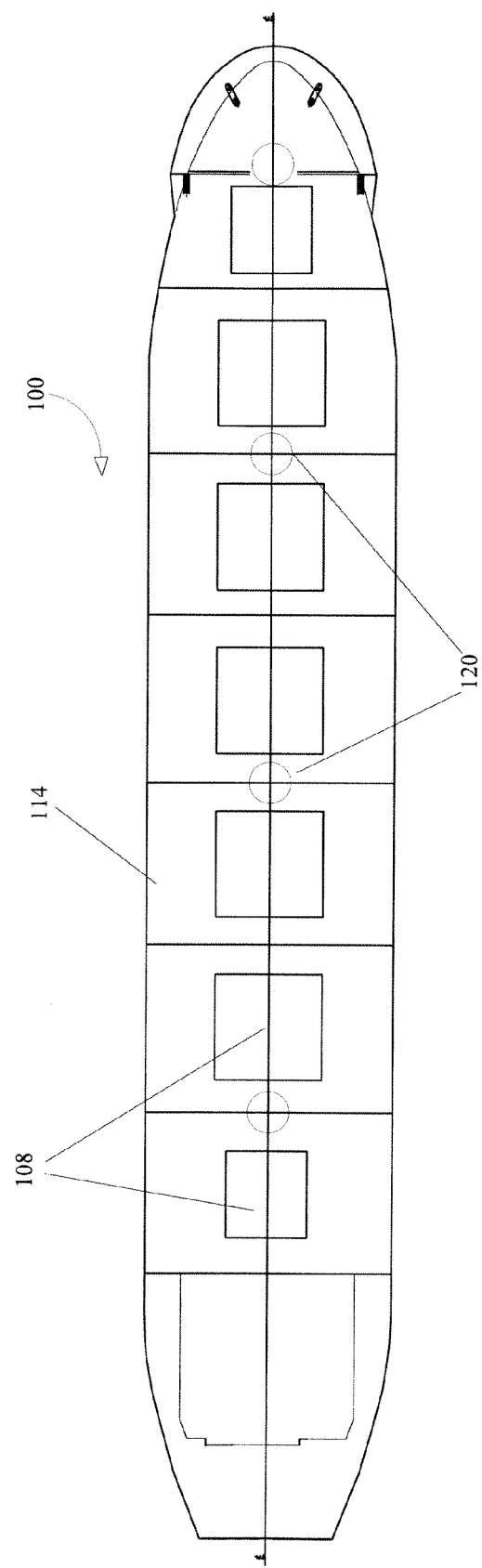
FIG. 2 is a plan view of a ship using features of some embodiments.

Reference is now made to FIG. 2 where a top plan view of the ship 100 of FIG. 1 is shown. FIG. 2 shows one potential placement of the sail systems 120 on the deck 114 of the ship 100. Each sail system 120 may be positioned along the center line of the ship 100 and spaced apart to ensure each sail receives relatively clean wind flow when extended. The sail systems 120 may also be positioned between hatch covers 108 so that when the sail 120 is retracted (e.g., positioned below the deck 114) workers and crew may be able to freely work in the area between the hatch covers 108. In some configurations, when the sails 120 are fully extended and placed in operation, there is sufficient area between the sail system 120 and hatch covers 108 to allow clear passage.

Figure 3:
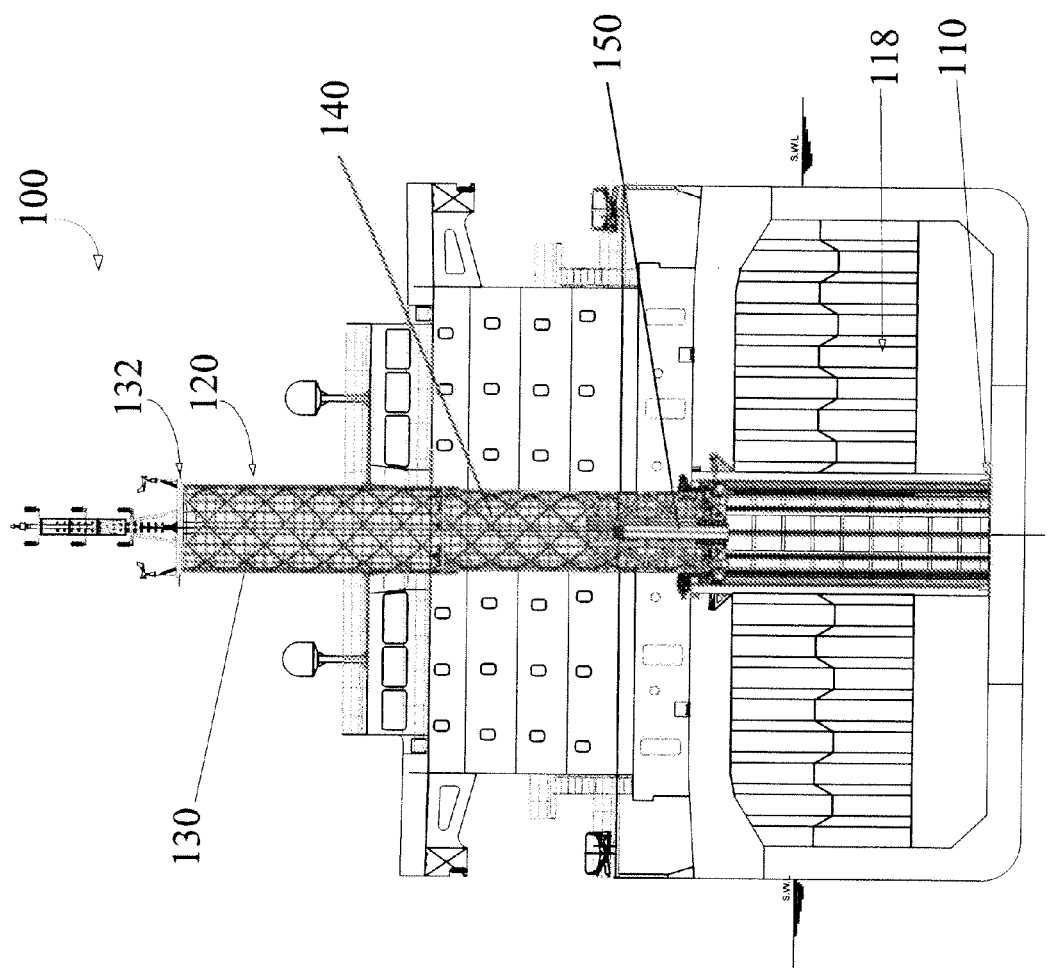
FIG. 3 is a sectional view of a ship using features of some embodiments.

Referring now to FIG. 3, a sectional view of the ship 100 is shown, showing details of one sail system 120. As shown, a bottom section of the sail system 120 (the silo 122) is attached to the keel floor 110 by welding or otherwise attaching a base of the silo 122 to the keel floor 110.

In effect the silo 122 is the housing for the retracted upper sail cylinder 130 and lower sail cylinder 140. As will be described further below, in some embodiments, the silo 122 is a heavily built 16 sided tube which extends from the ships inner bottom (the base surface of the hold or keel floor 110) to the weather deck. It is fixed into the transverse bulkhead 118 and may be formed as a complete compartment with a single opening at the weather deck.

Reference is now made to FIGS. 4a-4e where a series of views of a sail system 120 are shown in different positions during a lift cycle. As used herein, the term "lift cycle" is used to refer to the sequence of mechanical movements used to extend (or retract) the sail system 120. Each of the FIGS. 4a-4e represent a different sequence in the lift cycle. Control and operation of the lift cycle may be enabled by command and control software.

The lift cycle of the present invention uses a reciprocating lift function whereby the sail system 120 is extended to its full operational height in a series of up and down maneuvers. The complete set of lifting maneuvers is outlined below. Pursuant to some embodiments, by using the lift cycle of the present invention to extend the sail system 120, operators, ship owners, and crew members enjoy a number of benefits over other retractable rotor systems that employ single action lift functions. For example, by use of a reciprocating lift function of the present invention, the distance of travel of any component (such as the upper sail cylinder 130, the lower sail cylinder 140, etc.) is half that of other systems. In a single action lift system, either the rotors, mechanical sail assembly, or lifting mast must travel the full distance from stowage to full extended. This results in a system that is more prone to racking, pinching and jamming. Embodiments of the present invention eliminate or substantially reduce these issues by reducing the travel for the lift carriage 150 and sail cylinders 130, 140.

The reciprocating lift approach of the present invention also has major advantages over lifting systems that utilize a fixed mast or telescoping lift such as an hydraulic ram or other multistage device or jack. The system of the present invention saves weight by utilizing the main components of the sail system 120 in its own deployment and by using components of the sail system 120 play completely different roles throughout the deployment/retraction cycle and sailing operations while only making the same movement operations.

Because embodiments of the present invention only uses the silo 122 and the locking devices (such as shot pins, described below in conjunction with FIGS. 6-10), which are also used to fix the sail cylinders 130, 140 and lift carriage 150 in place for sail system 120 operation, embodiments of the present invention make it possible through a sequence of strokes and shot pin activations and retractions to affect complete deployment of the sail system 120. Such a multi-use of components of the lift system provides a number of desirable advantages, including reduced manufacturing cost, reduced complexity, and reduced operational and maintenance issues.

Embodiments of the present invention also allow all lift operations to be made by motors at weather deck level which drive rotary winch sprockets to pull or pay high strength chains attached to the lift carriage (as described further below in conjunction with FIGS. 5, 6, 11 and 12). The lift motors act in unison and provide level and equal lift around the circumference of the lift carriage. These chains also provide support in both the positive and negative direction when the sail system 120 is moved by motion of the ship 100.

Figure 4A:
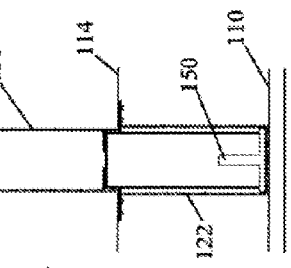
FIGS. 4a-4e are sectional views of mechanical sails pursuant to some embodiments.

Referring first to FIG. 4a, the lift cycle will now be described. As shown in FIG. 4a, the sail system 120 is in a stowed position, with the components below the deck 114. In particular, the silo 122 stores the components including the upper sail cylinder 130, the lower sail cylinder 140, and the lift carriage 150 (as well as drive motors and other lifting apparatus that will be described further below). When stowed, a top plate 132 may protect the sail components from the weather and clear the deck for lading, or the like.

Figure 4B:
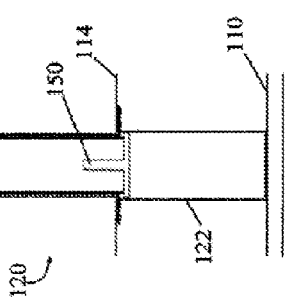
Figure 4C:
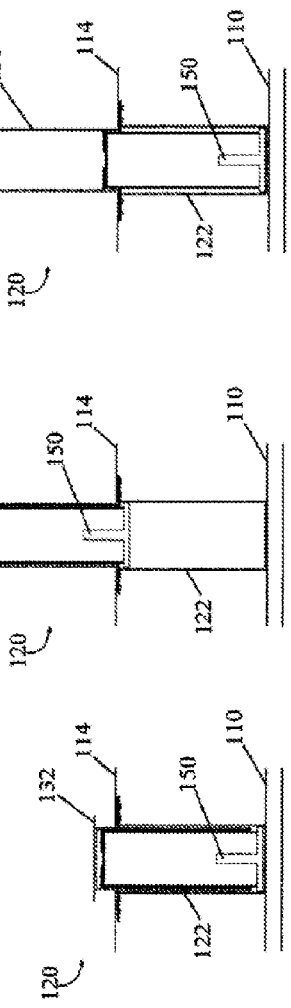

Referring to FIG. 4b, the lift cycle starts with both sail cylinders 130, 140 being lifted on the lift carriage 150 to weather deck level 114 from their initial stowed position in the silo 122. As shown in FIG. 4c, once both sail cylinders 130, 140 have been lifted to weather deck level 114 shot pins (not shown in FIG. 4, but described further below) extend from the silo side and lock the upper sail cylinder 130 alone at the weather deck level. The lower sail cylinder 140 and lift carriage 150 return to the retracted position in the silo 122 leaving the upper sail cylinder 130 above the deck 114.

Figure 4D:
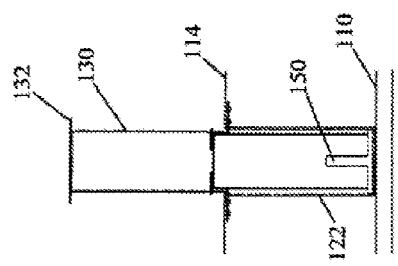

Referring now to FIG. 4d, at this point shot pins located on the top of the lower sail cylinder 140 (shown in conjunction with FIG. 7) are activated. These pins lock the upper and lower sail cylinders 130, 140 together; the bottom of the upper sail cylinder 130 being locked to the top of the lower sail cylinder 140.

Figure 4E:
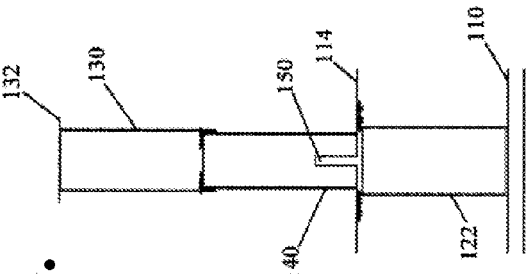

Referring now to FIG. 4e, the shot pins at the weather deck are now retracted allowing the upper sail cylinder 130 to move freely. The full sail system 120 assembly (including both sail cylinders 130, 140 and the lift carriage 150) is now lifted to the deployed position at the weather deck 114. Once in position the shot pins at the weather deck level are activated to lock the lift carriage 150 at the weather deck where the sail system 120 can be run to produce propulsion.

The lift cycle is run in the reverse sequence to retract the sail system 120. For example, the shot pins at the weather deck level are retracted allowing the complete sail system 120 assembly (including both sail cylinders 130, 140 and the lift carriage 150) to retract into the silo 122. When the lift carriage 150 reaches the bottom of the silo 122, the deck level shot pins are activated which lock the upper sail cylinder 130 in place at the weather deck level. When it is confirmed the upper sail cylinder 130 is locked at the weather deck level, the shot pins on top of the lower sail cylinder 140 are retracted which decouples the sail cylinders 130, 140 from each other.

The lower sail cylinder 140 is now free to move up inside the upper sail cylinder 130. The lower sail cylinder 140 and the lift carriage 150 are lifted to the weather deck level. Once all three components are at the weather deck level the weather deck shot pins are retracted and the lift carriage 150 and both sail cylinders 130, 140 (which are now nested) are lowered into the silo 122. When all components, including the sail cylinders 130, 140 and the lift carriage 150 are in the fully retracted position the top plate 132 engages on the scupper wall around the deck opening at the weather deck level. Locking clamps may be engaged to make the sail system 120 weather tight and to secure the sail system 120 in extreme or dangerous sea conditions.

Features of some embodiments of the silo 122 will now be described by reference to FIG. 5, where a view of a silo 122 in position between a deck 114 and a keel floor 110 is shown. Pursuant to some embodiments, the silo 122 is installed with a number of components deployed therein, including a lift carriage 150 and drive motors 170. The silo 122 is formed to provide a strong casing for the sail system 120 when retracted, and acts as a framework and structural support when the sail system 120 is deployed. Further, the silo 122 is configured to transfer thrust from the sail system 120 into the structure of the ship 100 to propel the ship 100. In some embodiments, the silo 122 is formed from steel as a 16-sided tube extending from the keel floor 110 to the weather deck 114. In some embodiments, the silo 122 is designed with rolled steel corner pieces that extend the full height of the silo 122 and that act as rails that the lift carriage 150 runs along as the lift carriage 150 is raised or lowered. In some embodiments, the silo 122 is fitted into the ship's transverse bulkhead and the bulkhead it replaces is removed.

Each corner of the 16 sides may be heavily reinforced with a formed girder, which facilitates fastening the vertical guides for use by the lift carriage roller guides (shown below in FIG. 6). The silo 122 is preferably of such strength that it may withstand the pressure of a loaded cargo hold (which may be filled with heavy ore or coal) without deflection.

Arranged around the top circumference of the silo 122 are the deck level shot pins 176. These shot pins 176 are at a level slightly above the weather deck height, but protected below a watertight mezzanine deck where the lift motors, gearboxes and sprocket guides are housed.

Figure 5:
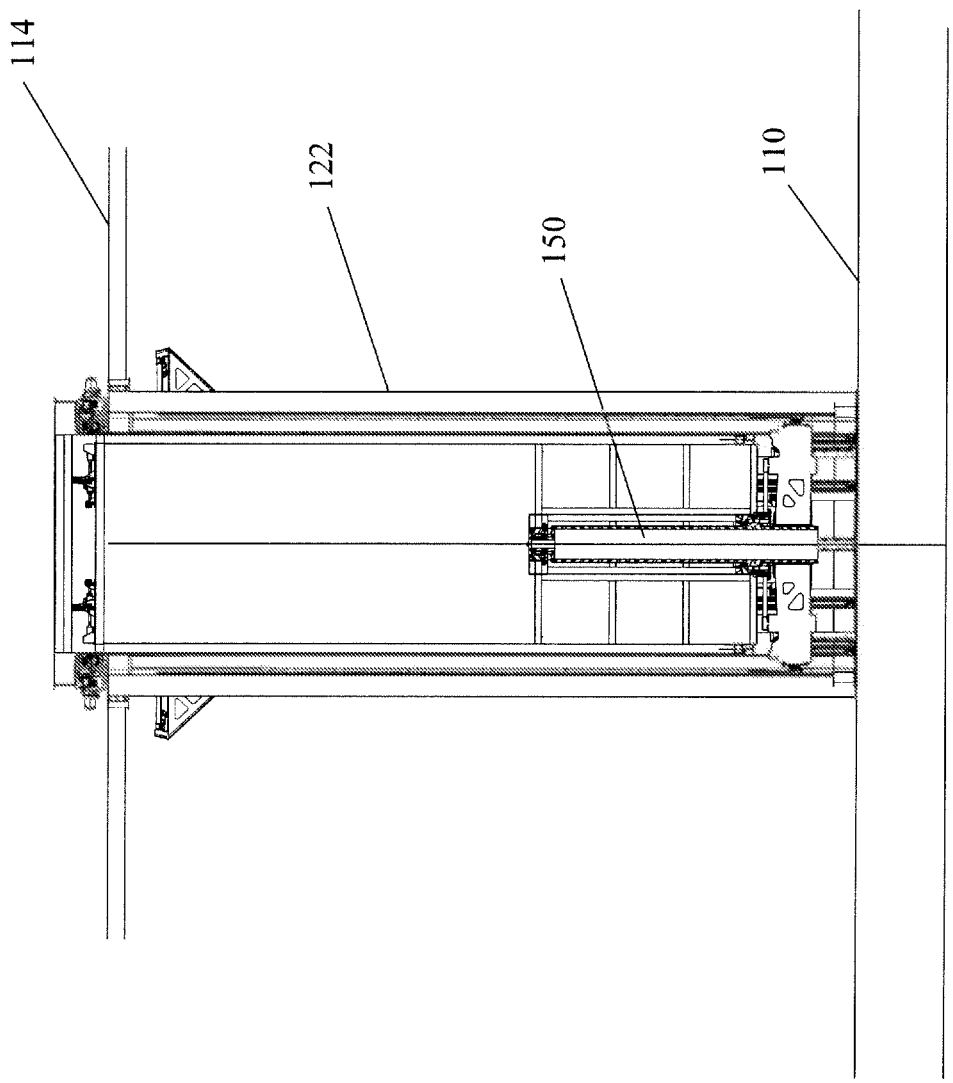
FIG. 5 is a sectional view of a portion of a mechanical sail pursuant to some embodiments.

The bottom of the top plate creates a waterproof seal with the silo 122 housing when the top sail is lowered (as shown in FIG. 5). While applicants believe a 16-sided silo structure provides desirable results, other silo frame structures may also be used.

Figure 6:
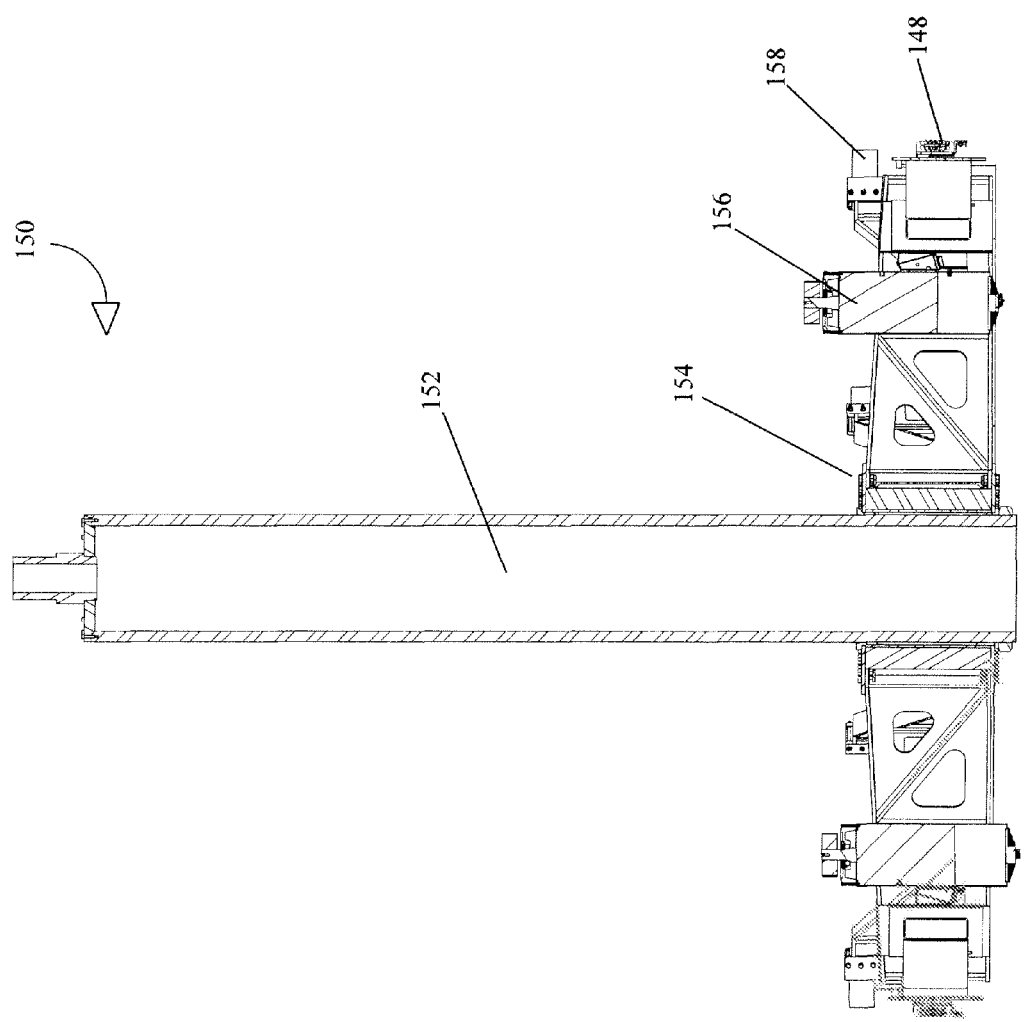
FIG. 6 is a sectional view of a lift carriage pursuant to some embodiments.

Referring now to FIG. 6, the lift carriage 150 disposed within the silo 122 is formed around a central spindle 152 which extends upwards from a horizontal planar platform 154. The horizontal planar platform 154 is substantially circular (that is, it is formed to fit within the circumference of the silo 122) and is constructed in heavy steel in a radial framework fashion. The horizontal planar platform 154 has a vertical spindle 152 of heavy walled steel, which is finely machined to accept the bearings of the sail cylinders 130, 140, which are located inside the tubular core (described below in conjunction with FIGS. 7 and 8). The horizontal planar platform 154, together with the spindle 152 are referred to herein as the "lift carriage."

Figure 11:
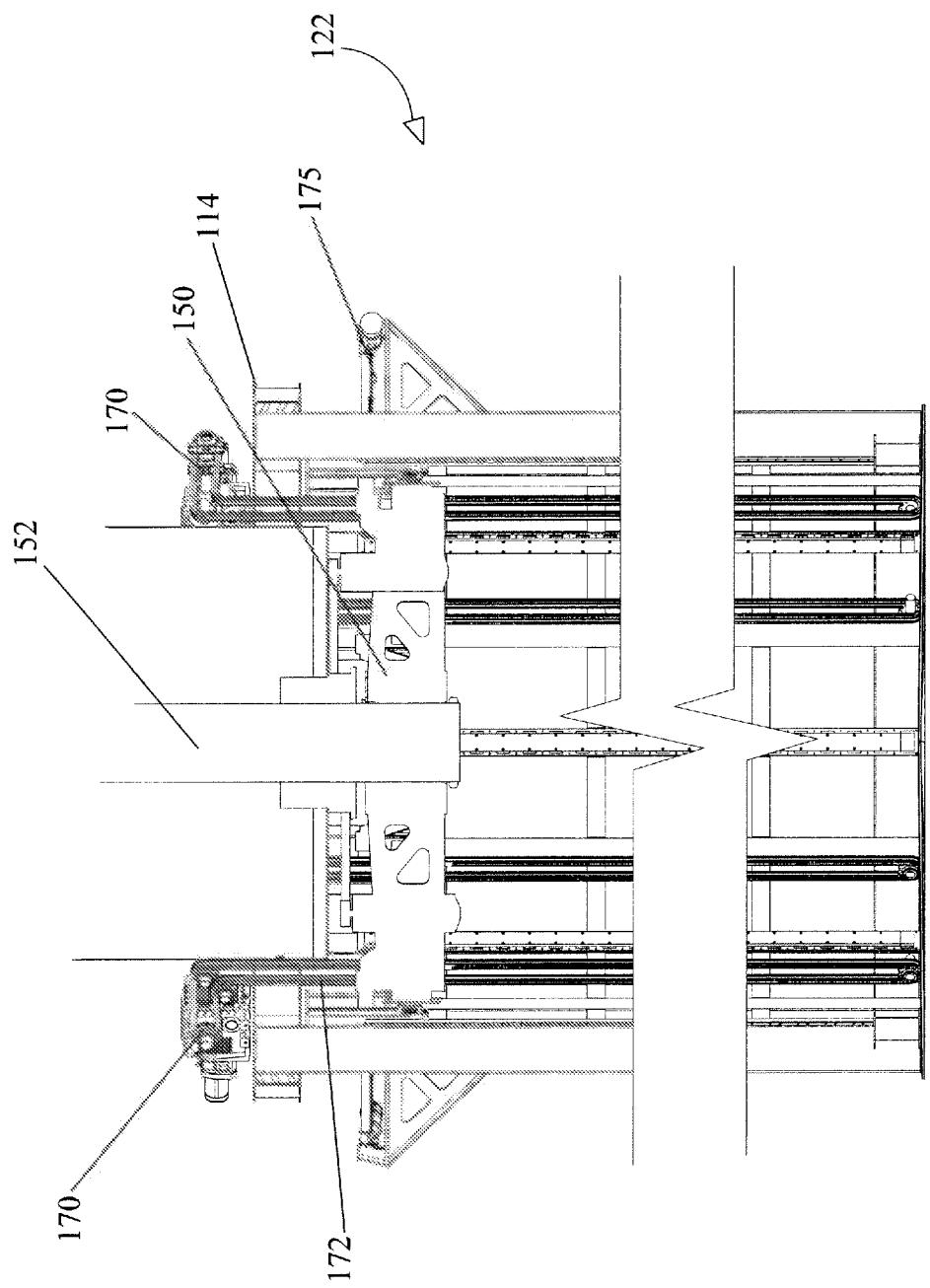
FIG. 11 is a sectional view of a portion of the sail system including a portion of a silo pursuant to some embodiments.
Figure 12:
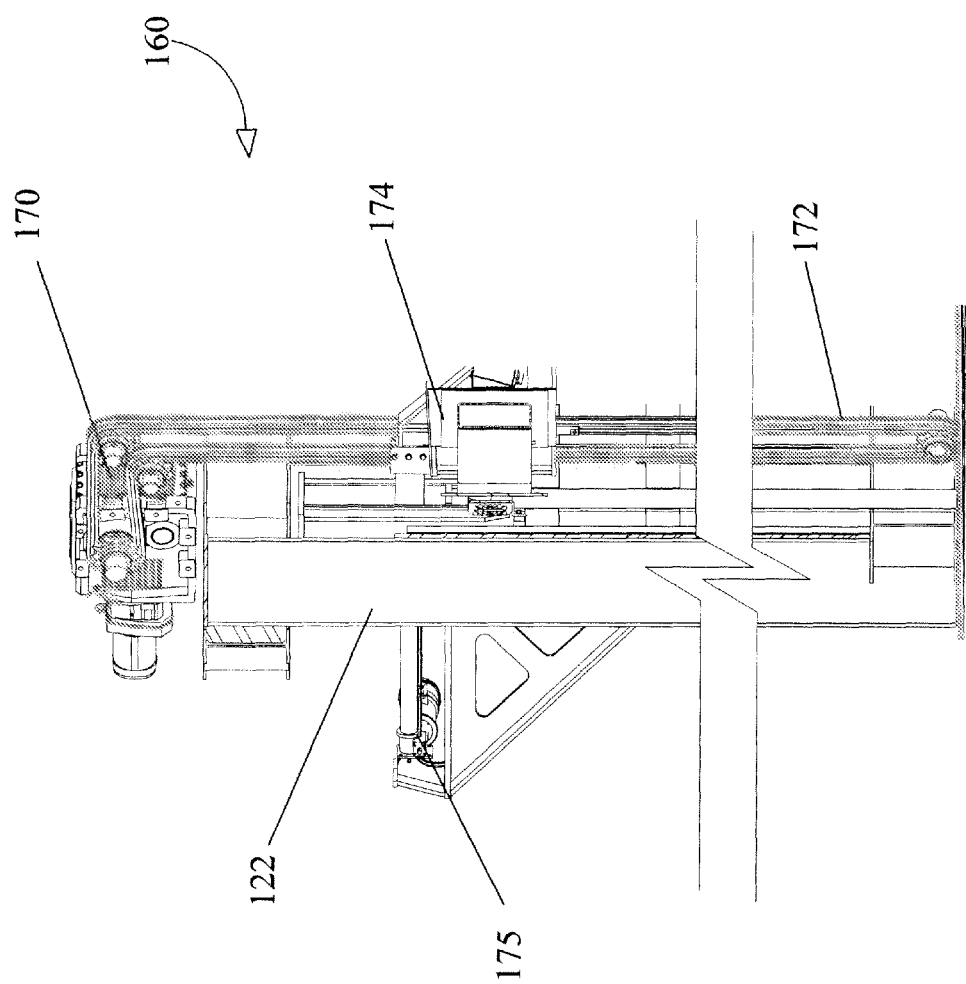
FIG. 12 is a sectional view of a portion of the sail system including a portion of a lift drive pursuant to some embodiments.

In some embodiments, the lift carriage 150 has 16 spokes (or radial arms 154) radiating from the central spindle 152. Each radial arm 154 of the lift carriage 150 is strengthened by interconnecting steel members. The outer ends of the radial arms 154 have several attachments fixed to them. In one embodiment, eight of the radial arms 154 are fitted with roller guides 148 which act upon vertical lift guides in the silo 122 (as shown in FIG. 11). The other eight radial arms 154 are fitted top and bottom with chain end attachments (as shown in FIG. 12). As used herein, the term "chain" is used to refer to both a drive belt and a chain. Embodiments of the present invention may use either a drive belt or a chain (or a combination thereof) with desirable results.

Figure 7:
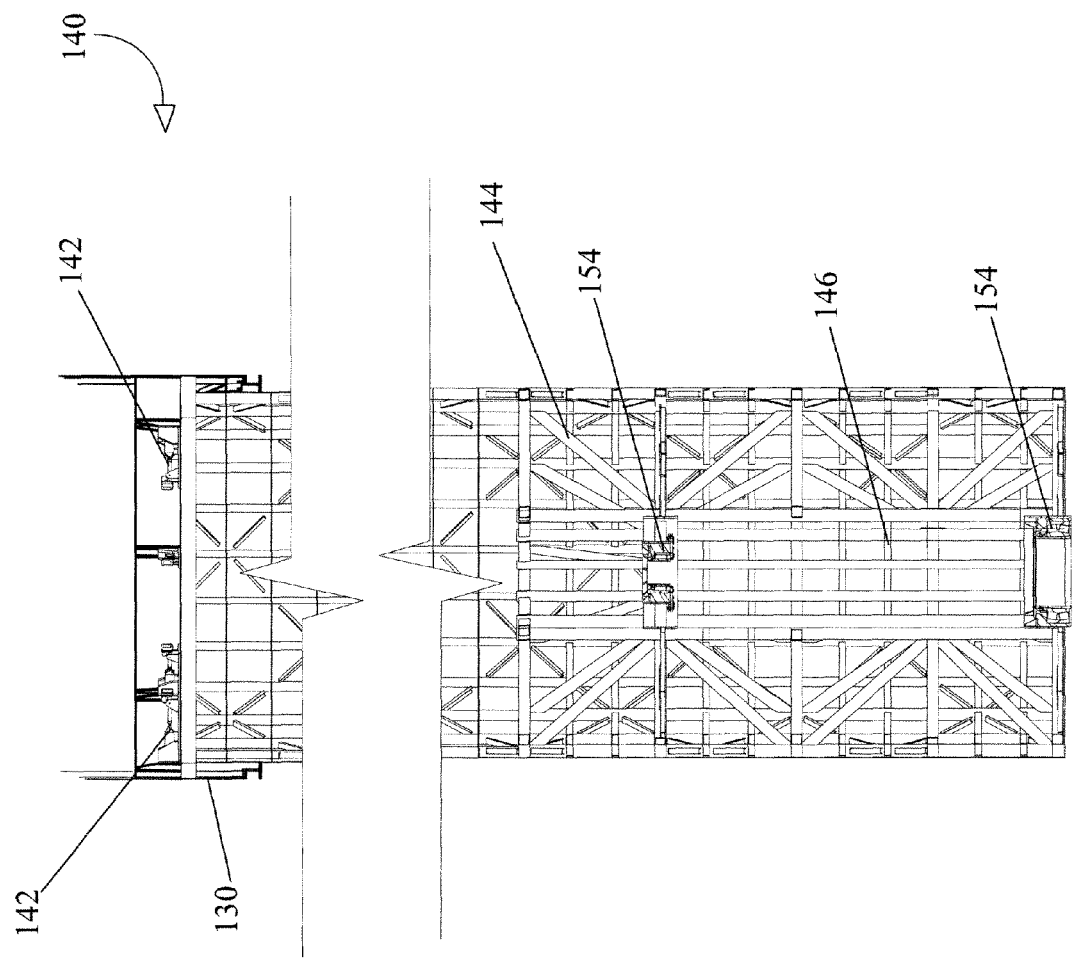
FIG. 7 is a sectional view of portions of the sail system pursuant to some embodiments.
Figure 8:
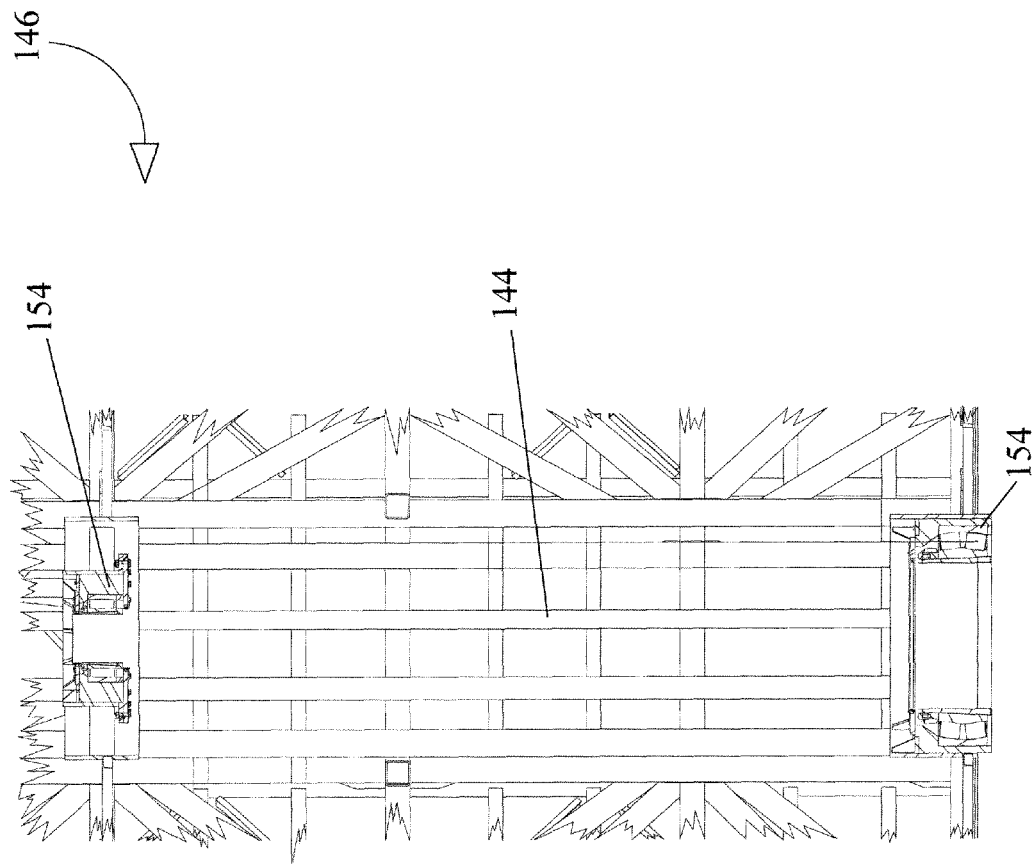
FIG. 8 is a sectional view of a portion of the sail system including a tubular core pursuant to some embodiments.

In some embodiments, two main bearings are situated vertically apart approximately 12 ft. on the spindle 152 of the lift carriage 150. In some embodiments, the upper of these bearings is a thrust and radial bearing and the lower is a radial bearing alone. Referring to FIGS. 7 and 8, the bearings act between the rotating sail cylinders at a tubular core 146. In FIG. 7, a tubular core 146 is shown as part of the lower sail cylinder 140 which is disposed within the silo 122. The lift carriage 150 is positioned such that the central spindle 152 mates with the bearings 154 in the tubular core 146. The sail cylinder 140 can then rotate about the non-rotating spindle 152. These bearings act between the rotating sail cylinder at the tubular core and the non-rotating spindle. The bearings allow the sail cylinder 140 to rotate about a vertical axis alone. The design of the bearings take into account the rotation velocity of the sail cylinders and well as any additional loads which might be applied to the sail system 120 due to the pitch and roll of the ship and the force of wind as might be expected while the sail cylinders are stopped or the lift as may be expected due to the Magnus effect as would be induced by spinning the sail cylinders in a wind flow. In some embodiments, a forced lubrication system is built into these bearings to extend bearing life and reduce heat as can be expected at high loads and rotation velocities. The bearings are preferably machined to fine tolerances and fitted to fine tolerance on both the spindle 152 and tubular core 146.

Those skilled in the art, upon reading this disclosure, will appreciate that the fit between the non-rotating spindle 152 of the lift carriage 150, the bearings 154 and the tubular core 146/sail cylinder 140 is an important design feature and tolerances must be closely machined and designed for each installation.

Referring briefly to both FIG. 6 and FIG. 12, the entire rotor and the lift carriage 150 are formed to move vertically inside the cylindrical silo 122. This vertical motion is affected by the lift motors 170, gearboxes and drive belts/chains 172. In one embodiment, a set of 4 lift motors 170 are evenly spaced and arranged about the top of the silo 122 at deck level 114. Each lift motor 170 drives a gearbox having two drive shafts extending from each. These drive shafts are fitted with sprocket wheels which engage with high precision into the drive chains. The drive belts/chains 172 run over guide sprockets and attach to the upper tensioning connectors 174 on the outside ends of the radial arms of the lift carriage. From the lower end of the same radial arm the drive belt/chain 172 is attached by the same type of tensioning connector. This drive belt/chain 172 continues down to a sprocket wheel which is located on the bottom of the silo 122. The drive belt/chain 172 runs around the bottom sprocket wheel and returns unimpeded to the deck level where it completes the circuit. Being a full circuit the lift drive is positive for both lift and decent having equal affect to the drive belt/chain 172 regardless of the direction of rotation of the drive sprockets.

It is important to ensure that each of the drives 170 are synchronous to ensure the lift carriage is maintained level through the lifting and deployment process. This level lift is greatly helped by the ability of the chain lift system to retain each point as well as lift, hence ensuring tripping or jamming of the carriage is eliminated.

Each lift chain connection is fitted to the end of 8 of the radial arms on the lift carriage. Between these arms are the radial arms which are fitted with guide rollers. The interspersing of these roles further ensures the smooth operation of the lift as vertical, horizontal and complex combinations of forces as can be expected from a ship at sea can be effectively overcome.

Further details of the use of the shot pins (including the set of upper shot pins 142 and the set of deck level shot pins 176) in some embodiments will now be described by reference to FIGS. 5, 9, 10 and 11. Lift operation starts with all sail cylinders 130, 140 housed in the silo 122 and the lift carriage 150 positioned at the bottom of the silo 122. The condition can be made secure by dogging the top plate 132 down to a circular scupper which is raised approximately 40 inches above the weather deck 114. To deploy the sail system 120 the following steps are followed. First, the top plate 132 is undogged. The drive motors are operated to cause the lift carriage 150 to lift the two sail cylinders 130, 140 to the deck level 114. The deck level shot pins 176 activate and extend to lock at a level below the bottom of the upper sail cylinder 130.

Next, the drive motors are operated to cause the lift carriage 150 to retract or descend. Because the lower sail cylinder 140 is not locked at deck level by the shot pins 176, the lower sail cylinder 140 also descends, leaving the upper sail cylinder 130 at deck level, held by the deck level shot pins 176.

Figure 9:
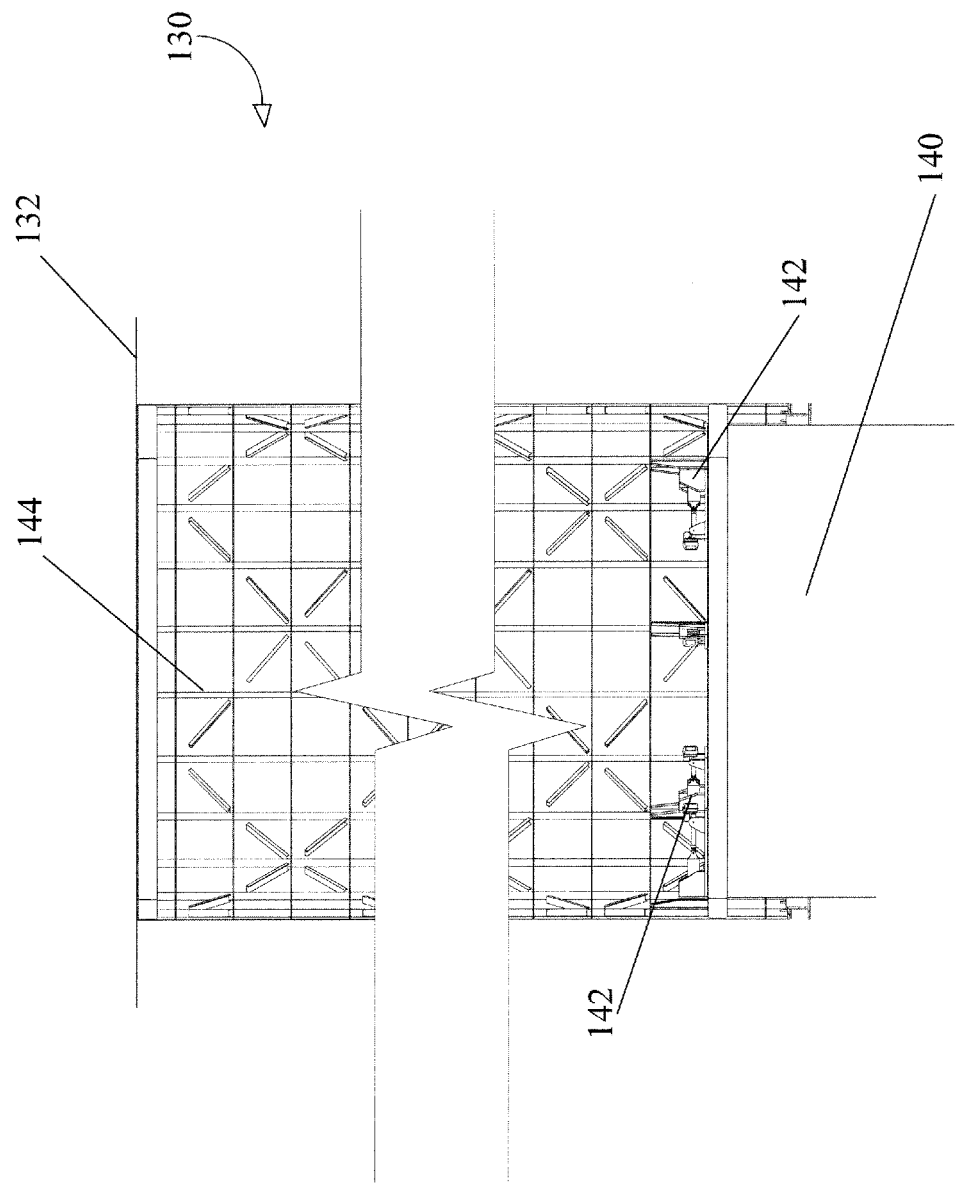
FIG. 9 is a sectional view of a portion of the sail system including an upper sail cylinder pursuant to some embodiments.
Figure 10:
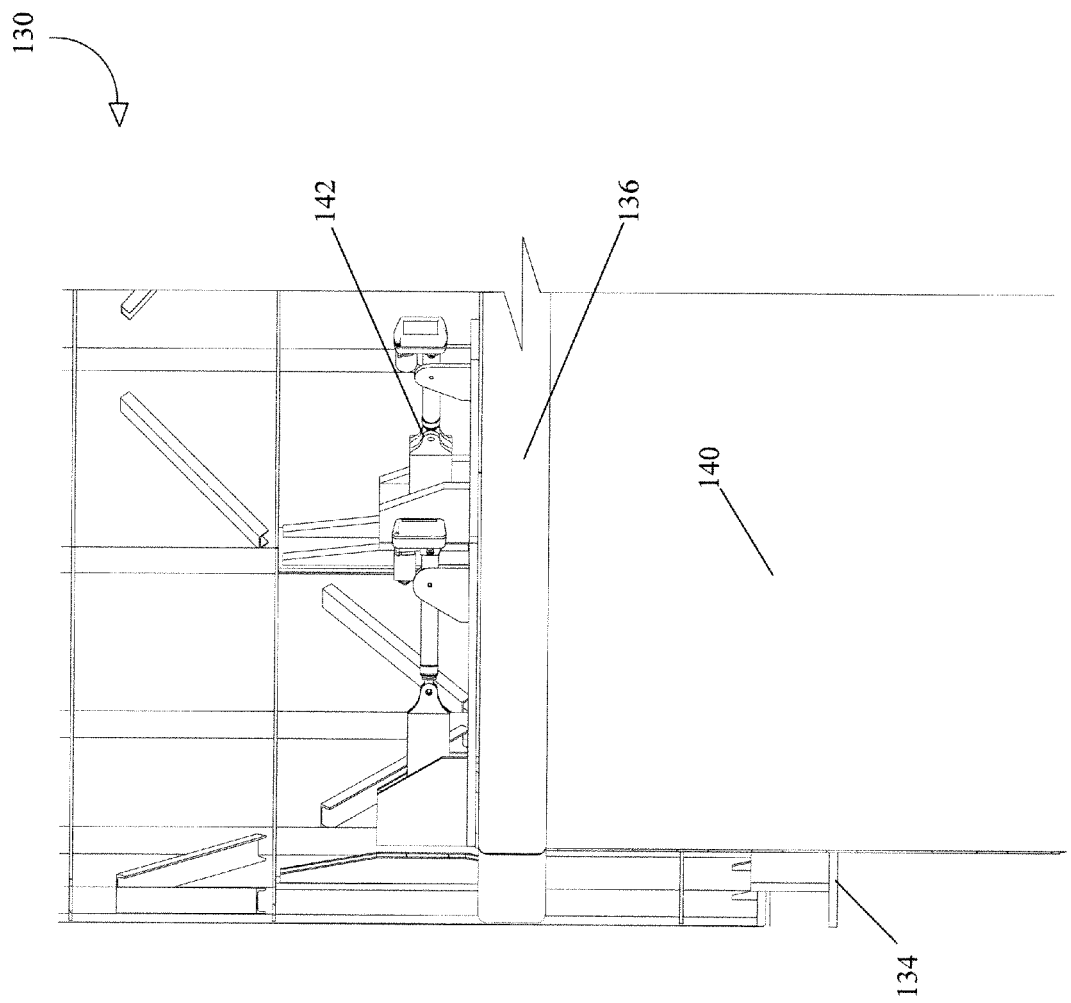
FIG. 10 is a sectional view of a portion of the sail system including a portion of an upper sail cylinder pursuant to some embodiments.

Next, the shot pins 142 in the upper section of the lower sail cylinder 140 are actuated. This causes the two sail cylinders 130, 140 to lock together. As shown in FIG. 9, the shot pins 142 are positioned on the upper section of the lower sail cylinder 140, and because the top portion of the lower sail cylinder 140 is now in a position aligned with the lower portion of the top sail cylinder 130, the shot pins can activate and pass through both cylinders 130, 140 from the inside of the sail cylinders 130, 140.

Next, the deck level shot pins 176 are retracted, and the drive motors are activated to cause the lift carriage 150 to lift both sail cylinders 130, 140 (now locked together) to the deck level 114. The deck level shot pins 176 are again activated and they lock the lift carriage 150 (at the shot pin receivers 158 of FIG. 6) in place. The sail system 120 is now deployed and can be used to produce thrust to propel the ship 100. To retract the sail system 120, the process is reversed.

Such use of the shot pins and other components to deploy and retract the sail system 120 provides a number of desirable advantages, including increased operational efficiency, and reduced maintenance.

Further features of the sail cylinders 130, 140 will now be described. The lower sail cylinder 140 has a similar structure as the upper sail cylinder 130, but it is a slightly smaller diameter, thereby nesting inside the upper sail cylinder 130 when the device is retracted or stowed. Pursuant to some embodiments, the lower half of the cylinder 140 is supported internally with a substantial dendritic lattice and this lattice has at its center a tubular core 146. The tubular core 146 is the connection point between the rotating sail cylinders 130, 140 and the static lift carriage 150. In general, two bearings are fitted into the tubular core, these allow the core (with the sail cylinders attached) to rotate freely about a heavy steel spindle 152 which forms the upper part of a lift carriage 150. At the lower end of the tubular core 146 is a grooved belt receiver, which is connected directly to the drive motors.

When deployed, the upper sail cylinder 130 extends above the lower sail cylinder 140 and is guided to its deployed position by vertical guides fitted inside the upper sail cylinder 130. These guides are matched by sets of roller guides on the upper end of the lower sail cylinder 140. These vertical guides and rollers ensure the two sail cylinders 130, 140 rotate in unison and effectively act as a rotational lock. When the upper sail cylinder 130 is raised to its deployed position it engages in its stops and is locked in place by shot pins 142 which are located in the overlap section between the two cylinders 130, 140. When activated these shot pins deploy horizontally to effectively run through both sail cylinders 130, 140 and hold (lock) both sail cylinders together.

When the upper sail cylinder 130 is raised to its deployed position it engages in its stops and is locked in place by shot pins 142 which are located in the overlap section between the two cylinders 130, 140. When activated these shot pins 142 deploy horizontally to effectively run through both sail cylinders and hold both sail cylinders locked together. A reinforced ring 136 (FIG. 10) may be attached to the lower section of the top sail cylinder 130 to provide rigidity to the section and to provide a strong connection point for the shot pins 142 which hold the sail cylinders 130, 140 together when extended. In some embodiments, the reinforced ring 136 may be formed of steel, aluminum or other lightweight material which provides rigidity and is resistant to corrosion.

The structural integrity of each sail cylinder 130, 140 may further be increased by the use of one or more ribs 144, including vertical ribs and horizontal ribs. Intermittent diagonal ribs may be fitted between the ribs, and spaced to produce torque resistance in the framework. The ribs may be formed of a material such as thick tubular steel sized to provide sufficient structural support.

Each of the sail cylinders 130, 140 are skinned by attaching a sheet of material, which can be aluminum, steel or a composite material. The choice of material can be influenced by the intended region of operation and the temperature ranges in which the sail systems 120 will be deployed to operate. The skin may be attached to the sail cylinder framework by welding, rivets, screws or adhesive.

The sail cylinders 130, 140 are rotationally balanced and inertia vibration dampening devices may be fitted to the sail cylinders to eliminate vibration or the propagation of harmonic resonance during operation through the full working rev range. In some embodiments, the upper sail cylinder 130 is formed to be lighter than the lower sail cylinder 140 to provide a lower center of gravity of the sail system 120 when deployed, thereby reducing stress and load on the system.

Before an existing ship can be retrofitted with the sail system of the present invention, an in-depth engineering analysis is required to ensure the strength of the ship's structure is sufficient to safely transfer the forces exerted by the sail system 120 when in operation. If additional structural members or reinforcement are required they should are added to the ship as necessary prior to and/or during installation of the sail system 120.

In some embodiments, a transformable below deck seal (e.g. sliding or hinged) at the top of the sail system 120 creates a waterproof seal when the sail system 120 is raised. The bottom of the top plate 132 creates a waterproof seal with the silo 122 when the sail system 120 is lowered.

In some embodiments, the silo 122 is incorporated below deck into the transverse bulkhead. The base of the silo 122 is fitted to the keel member or the closest point above this member. In some situations, the ship's scantlings and deck must be adjusted to achieve the required strength to withstand the forces exerted on the hull by the sail system 120. In some embodiments, a hydrostatics analysis of each ship may be required to prove her stability with the sail systems deployed and the ship in her least stable condition under normal operation.

While the sail cylinders 130, 140 have been described as being formed of aluminum and steel, other materials may be used with desirable results. For example, the cylinders (or portions thereof) can be constructed of flexible materials such as canvas or plastics that stretch over the cylinder's internal support structure or of modular rigid pieces that tile to form a complete surface. Further, alternative skin materials can be used such as marine grade metals and composites. The support structure such as the ribs can be formed of other materials as well, including steel or the like.

Pursuant to some embodiments, the sail cylinders 130, 140, and the lift carriage 150 may spin freely about the spindle of the lift carriage 150. In some embodiments, drive motors (in some embodiments, four of which are fitted in pairs on opposing sides of the spindle 152 on the lift carriage 150) are used. A belt or drive chain is run about the tubular core base and out to the first of the pair of drive motors. The belt engages in a drive pulley attached to the shaft of the drive motor. The belt continues 160 degrees about the drive pulley and then onto a tensioning pulley which is located between the two drive motors. This pulley can be adjusted as to effect the tension of the belt. The belt is then passed through the second drive pulley on the second drive motor and then back to the tubular core to complete the circuit. When energized the drive motors (both pairs) supply drive in to the sail cylinders 130, 140 and the lift carriage 150 which rotates through the full rev range and is powered to do so solely by the drive motors. The speed as well as the direction of the motors is controlled by a computerized command and control system (as described further below in conjunction with FIG. 13). When de-energized the motors may act to slow the rotation of the sail cylinders 130, 140 and the lift carriage 150 by their own inertia and by means of an internal breaking system.

The position of the pairs of drive motors are, in some embodiments, directly and exactly opposite each other, ensuring a neutral balance of forces will be exerted on the tubular core from the drive belts or chains even during the run up (period of acceleration) of the sail cylinders 130, 140 and lift carriage 150, when the largest power will be exerted by the drive motors.

The control of the extension and retraction of the sail cylinders 130, 140 is performed by a control system including one or more lift motors, gearboxes and chains as shown in conjunction with FIGS. 11 and 12. In some embodiments, the motors 170 may be electric motors (such as 10 hp variable RPM hydraulic gear box motors). However, those skilled in the art will appreciate that other motors may be used. In some embodiments, the motors may be operated from a central control station (e.g., such as one positioned in the wheelhouse). In some embodiments, local control may be provided (e.g., such as from the deck). In some embodiments, the control systems may be augmented with override systems to allow emergency control of the lift carriage (e.g., to quickly retract the sail cylinders in the event of weather or other situations). Water may be drained from the silo 122 via one or more sump pumps. When the sail cylinders 130, 140 are retracted, the sections are securely housed within the silo 122 such that the deck 114 remains clear (e.g., during lading or unlading of the ship).

The silo 122 is mounted between the deck 114 and an existing bulkhead by a weld sized and positioned to provide lateral support to the sail system 120. The base of the silo 122 is secured to the keel floor by a weld. In this manner, a wide variety of ships may be retrofitted for use with sail systems of the present invention.

Figure 13:
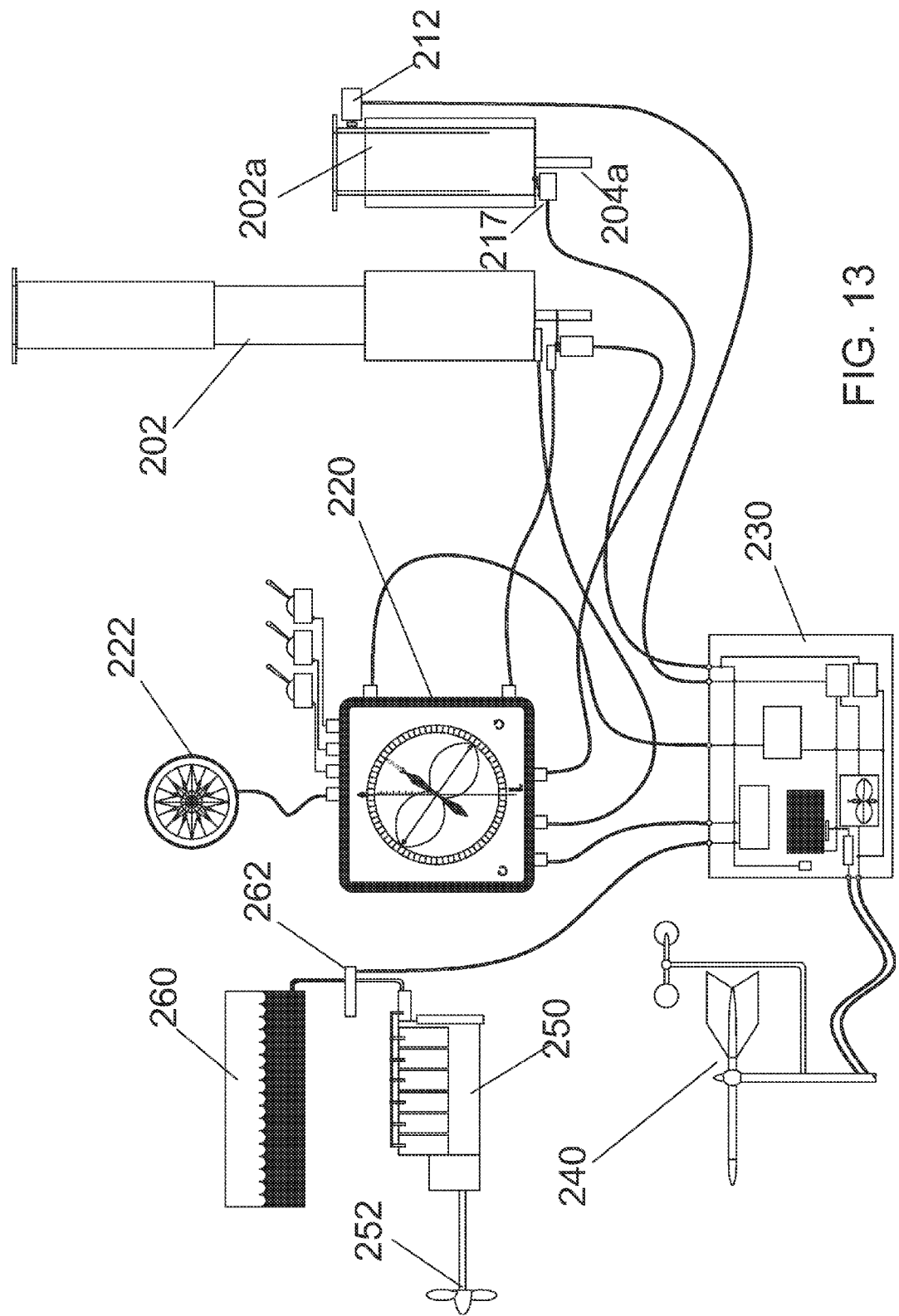
FIG. 13 is a block diagram of a control system pursuant to some embodiments.

Reference is now made to FIG. 13, where further details of the control systems 200 that may be used in conjunction with features of the present invention are shown. As depicted, control systems 200 include components to control the deployment of a sail system 202 such as a switch 217 to control the lifting motors. Systems 200 further include components to start rotation of the sail cylinders 202. Such components may include a motor 216 which may be switched and controlled from the logic center 230 to start the rotation of the sail cylinder 202 or to change the direction of rotation of the sail cylinder 202 as needed. A tachometer 218 may be associated with each sail cylinder 202 to monitor the speed of rotation of each sail 202. Data from the tachometer may be provided to the logic center 230 for use in controlling the sail systems and for monitoring performance.

Pursuant to some embodiments, the command and control systems 800 may include code that provides onboard and onshore data and decision support to maximize fuel efficiency. The command and control systems provide automated and manual overrides which control the sail systems 120, and which gather information from the ships weather head, including but not limited to, wind speed, wind direction relative to the ships heading. Ships course and heading information is gathered from the ships bridge compass. Inputs from the ships engineering department include ships speed, fuel usage tons per day, and ballast condition. Information and status data gathered by the command and control systems 800 may include information identifying the current state of each sail system (e.g., whether it is deployed or retracted, the direction of rotation, and sail cylinder rotational dynamics such as revolutions per minute).

In some embodiments, algorithms may be used to optimize the rotational speed of the sail systems to a given wind speed while calculating the drive produced as a proportion of the ships power requirement at a given ship speed. In some embodiments, the control systems 800 display the savings in fuel per hour and per day as well as a running total for a given voyage.

In some embodiments, the screen display of the command and control system may show a compass rose, where the lubber line equates to the ships heading. This line is graduated from the center in 5% increments from 0% to 100%. A curve of sailing angles is shown on both sides of the rose. These curves show the percentage of sailing efficiency of the sail systems at a given wind angle. The rose adopts a direction on the screen as a factor of the ships heading relative to the apparent wind direction. The curve of sailing angles will move past the graduated lubber line and the percentage of sail system sailing efficiency can be read directly from the screen. This percentage may also be displayed as a percentage on the top right side of the screen.

In some embodiments, suggested course correction may be shown on the top right hand corner of a display screen. This is calculated from the sail efficiency percentage and displays to the officer of the watch a course adjustment suggestion which will result in a higher sail system sailing efficiency percentage. In general, the motor 216 may be an electric motor or a pair of electric motors that is connected to the lift carriage or to the sail cylinders by a chain or belt drive. The rotation speed may be controlled by a variable speed gear box or electronic control unit on the motor 216 (and may be remotely controlled from a logic center 230). There may be a second motor installed as a spare for immediate deployment at sea.

The lower part of the sail cylinders is driven by the drive motors. These can be engaged by a toothed belt, chain or gear. In some embodiments, the motors do not change location. In some embodiments, the sail cylinder is permanently engaged with the drive motors. This connection can be used as an overrun arrestor if required.

The sail system can aid in the steering of the vessel as well as assist in a crash stop maneuver. A crash stop maneuver is used to bring the vessel to a stop as fast as possible. The sail system can be used to add reversed thrust and reduce the amount of time and distance needed to slow down and stop the vessel. It can take up to two miles to fully stop a large vessel and additional reverse thrust provided by the sail system could help reduce the amount of time and distance needed. There are also a number of directional changes that can be achieved by using the sail system. Therefore, the sail system can also function as an emergency rudder.

There is also a wind wall effect from having the sail cylinders rotate in opposite directions to one another which will give a more stable and useable drive vector when running down wind. Wind wall effect occurs because the sail system is producing thrust perpendicular to the keel direction when the wind is directly astern (running down wind). There is an effective wall of disturbed air from the sail system out over the side of the vessel. This acts on the sail system at the equivalent of approximately four times the cross section of the sail area of the sail system. Each sail cylinder is to be set to rotate in opposite direction to the next so that there is a wind wall off of the port and starboard sides. This effect gives the sail system a wider range of drive and only leaves 15 degrees port and starboard off the wind as the only dead angle for producing incremental thrust, thus improving the overall efficacy of the sail system.

In some embodiments, the sail cylinder 202 may rotate in two directions, with the direction of rotation determined by the direction of the wind or manually by an operator (through inputs to motor 216 directly or via logic center 230).

In some embodiments, an operator may interact with the logic center 230 to optimize and control the speed of the rotation to optimize fuel efficiency. In some embodiments, the data presented to an operator may include data from other ship-based systems, including a weather vane 240, a fuel flow meter 262 (measuring fuel consumption from the fuel bunkers 260), and navigational instruments such as a compass 222. All of the data, in some embodiments, may be presented to an operator via a control screen 220 which shows current operational statistics (such as the ship's heading, the wind speed and direction, and the current fuel consumption rate). A visual representation of heading or course changes that may improve fuel consumption may also be provided based on the data collected from the different inputs. In this manner, operators may optimize fuel efficiency by making course changes. In some embodiments, the logic center 230 further allows an operator to retract or extend one or more mechanical sails 202. In some embodiments, mechanical overrides may be provided to allow the retraction of the sail cylinders in an emergency (such as in sudden hazardous weather situations). Such mechanical overrides may be provided at the base or near each sail system so that crew members may retract the sail cylinders quickly as needed.

The control screen 220 may be provided at the bridge and report a variety of data retrieved from the sail system sensors. Data may include the state of each sail cylinder (e.g., extended or retracted), the rate or rotation of each sail cylinder (e.g., as RPM), the direction of rotation of each sail cylinder, the amount of fuel being consumed by the engine and the engine's current power output.

In some embodiments, the sail systems may have sensors permitting automated retraction when the ship is moving close to or directly into a headwind, when operating in high wind or high sea conditions, when passing under low bridges and underpasses, when docking in port or when cranes and other on board machinery are being used among a number of other defined states. These states may be determined by onboard sensors as well as remote signaling devices. In some embodiments, sensors are provided to report the current and anticipated wind speed and direction, relative to the ship. Additional sensors may be provided to determine the pressure on the sail cylinder skin and mast.

Pursuant to some embodiments, the logic center 230 may include computer code, implementing algorithms and operating procedures to determine the optimal use and deployment of the sail systems. For example, algorithms which compare the ratio of surface velocity of the sail cylinder skin to the velocity of the wind may be provided to compare drive output through an expected working range of wind speeds. Such data may be calculated based on the structural characteristics of a specific sail system implementation. Further, algorithms may serve to ascertain the optimal course for the ship to steer as a function of current wind conditions. This information is displayed in graphic form on the display 220 to the ship's commander and gives advanced information about the fuel savings.

In some embodiments, a state of the art weather routing system may be accessed from the control screen. The computer routing system is programmed to allow the ship to set a course between ports, make course corrections for hazards and will then optimize the route for fuel consumption, and best time of arrival.

The weather routing facility has an optimization facility for the sail systems of the present invention. This takes into consideration the current weather situation (Met-Sit) and projects a forecast for up to 16 days. The previously entered route may be automatically be adjusted to take the ship along a route which will make best use of the wind conditions (for sail deployment and use) which are expected, while avoiding dangerous storm or sea conditions. Integrating both the working day screen and the weather routing and sail system optimization program give a powerful tool to the Navigation officer as well as the ship owner/operator.

Note that FIG. 13 represents a logical architecture for describing control processes according to some embodiments, and actual implementations may vary. Moreover, each ship, sail system and control system described herein may be implemented by any number of devices in varying combinations. For example, some ships may be deployed with fewer or more than four sail systems. In the control system of FIG. 13, two or more of the devices shown may be deployed as a single chip set or functional system. Moreover, each device may comprise any number of hardware and/or software elements suitable to provide the functions described herein as well as any other functions. Other topologies may be used in conjunction with other embodiments.

All control systems and processes discussed herein may be embodied in program code stored on one or more computer-readable media. Such media may include, a CD-ROM, a DVD-ROM, magnetic tape and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases may be completely operated in RAM memory at a processor. Embodiments are therefore not limited to any specific combination of hardware and software.

Although embodiments have been described with respect to bulk cargo ships, note that embodiments may be used to achieve desirable results associated with other ships or vessels. In some embodiments, a maintenance program or system may be provided. Most of the under way maintenance is provided by self greasing and oiling units and components. Regular inspections and observations may be required on all moving parts as well as electrical connections and monitoring and reporting devices. Bore scoping of the extended mast may be required after an in-service period of a pre-determined time period (e.g., one year). Further, while the use of two sail cylinders have been described, those skilled in the art will appreciate that other numbers of cylinders may be used.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:
1. A mechanical sail system, comprising:
a silo, positioned below a deck level of a ship;
a lift carriage, mounted within the silo, and supporting a first sail cylinder and a second sail cylinder, the lift carriage formed around a spindle which extends from a horizontal planar platform; and at least a first drive motor coupled to a control system for selectively positioning the lift carriage within the silo, the control system operable to control said at least first drive motor to position said lift carriage at a top position within the silo to deploy the first and second sail cylinders.

2. The mechanical sail system of claim 1, wherein the sail cylinders are rotatable about the spindle, and wherein the lift carriage is rotationally fixed within the silo.

3. The mechanical sail system of claim 2, wherein the rotation of the sail cylinders causes the transfer of thrust to the structure of a ship.

4. The mechanical sail system of claim 1, further comprising at least a third sail cylinder, wherein the lift carriage further supports the at least third sail cylinder, and the at least first drive motor is operable to deploy the first, second and at least third sail cylinders.

5. The mechanical sail system of claim 1, wherein the first sail cylinder is a lower sail cylinder, and the second sail cylinder is an upper sail cylinder having a slightly larger diameter than the first sail cylinder.

6. The mechanical sail system of claim 5, wherein the second sail cylinder is lighter than the first sail cylinder.

7. The mechanical sail system of claim 1, wherein the lift carriage, the at least first drive motor, and the first and second sail cylinders are stored within the silo when the system is not deployed.

8. The mechanical sail system of claim 7, further comprising a top plate for protecting the lift carriage, the at least first drive motor, and the first and second sail cylinders when stored within the silo.

9. The mechanical sail system of claim 2, wherein the lift carriage is formed with a set of radial arms extending from the spindle, a portion of the set of radial arms ending with a roller guide mating with a track on the silo.

10. The mechanical sail system of claim 9, wherein there are sixteen radial arms, and eight radial arms ending with a roller guide.

11. The mechanical sail system of claim 9, wherein a second portion of the set of radial arms end with a lifting point, the lifting point coupled via a drive belt to said at least first drive motor.

12. The mechanical sail system of claim 11, wherein there are sixteen radial arms, eight radial arms ending with a roller guide, and eight radial arms ending with a lifting point, the system further comprising a second, third and fourth drive motor.

13. A method for operating a mechanical sail system, comprising:
raising a lift carriage, a lower sail cylinder, and an upper sail cylinder to a top position within a silo;
activating a first locking device to secure the upper sail cylinder at the top position;
retracting the lift carriage and the lower sail cylinder to a bottom position within the silo;
activating a second locking device to secure a top portion of the lower sail cylinder to a bottom portion of the upper sail cylinder;
deactivating the first locking device;
raising the lift carriage, the lower sail cylinder, and the upper sail cylinder to the top position within the silo; and
activating the first locking device to secure the lower sail cylinder and the upper sail cylinder at the top position.

14. The method of claim 13, wherein the first locking device is a plurality of shot pins.

15. The method of claim 13, wherein the second locking device is a second plurality of shot pins.

16. The method of claim 9, wherein the raising and retracting of the lift carriage is performed using at least a first lift drive.

17. The method of claim 16, wherein the at least first lift drive is controlled by a control computer.

18. The method of claim 16 wherein the at least first lift drive is positioned at a top of the silo and is connected to the lift carriage via a belt drive system.

19. A mechanical sail, comprising:
an upper sail cylinder, having a top plate and a base, the base holding a plurality of shot pins;
a lower sail cylinder, having a diameter slightly less than a diameter of the upper sail cylinder, and having a top portion mating with the base of the upper sail cylinder, the upper sail cylinder and the lower sail cylinder removably connected by the shot pins; and
a lift carriage, having a central spindle, the lift carriage mating with a base of the lower sail cylinder such that the upper sail cylinder and the lower sail cylinder are together rotatable around the central spindle, the lift carriage held within a silo mounted beneath a deck of a ship.

20. A mechanical sail system, comprising:
a silo, positioned below a deck level of a ship;
a lift carriage, mounted within the silo, and supporting a first sail cylinder and a second sail cylinder; and
at least a first drive motor coupled to a control system for selectively positioning the lift carriage within the silo, the control system operable to control said at least first drive motor to deploy said first and second sail cylinders using a reciprocating lift function.

21. A mechanical sail system, comprising:
a silo, positioned below a deck level of a ship, the silo having at least a first track extending along an interior of the silo;
a lift carriage, mounted within the silo and movable along the at least first track within the silo, the lift carriage supporting at least a first sail cylinder; and
a drive mechanism coupled to the lift carriage and controlled by a control system, the control system operable to selectively position the lift carriage within the silo by moving the lift carriage along the at least first track to deploy and retract the at least first sail cylinder.

22. A mechanical sail system, comprising:
a silo, the silo extending between a deck level of the ship and an area below the deck level of the ship;
a lift carriage, mounted within the silo and movable within the silo between the deck level of the ship and the area below the deck level of the ship, the lift carriage supporting at least a first sail cylinder; and
a control system in communication with the lift carriage, the control system operable to position the lift carriage at the deck level of the ship to deploy the at least first sail cylinder and to position the lift carriage at the area below the deck level of the ship to retract the at least first sail cylinder.

* * * * *